W. CRESSLER.
Grain-Drill.
No. 9,740.  Patented May 17, 1853.
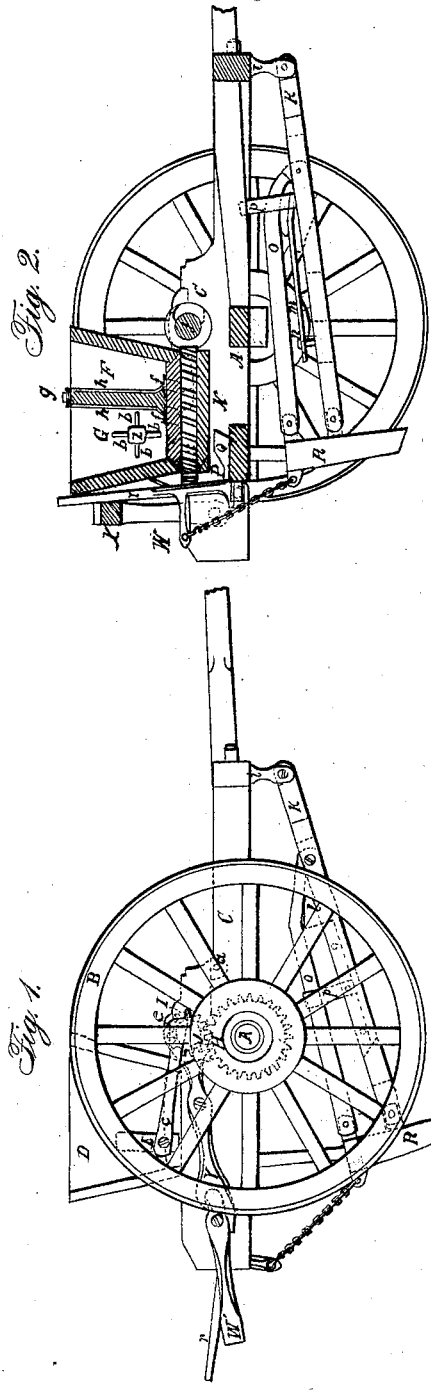
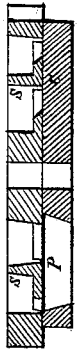
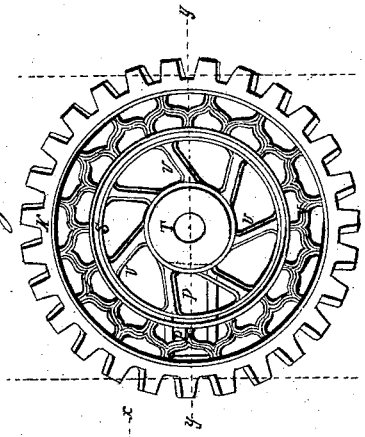
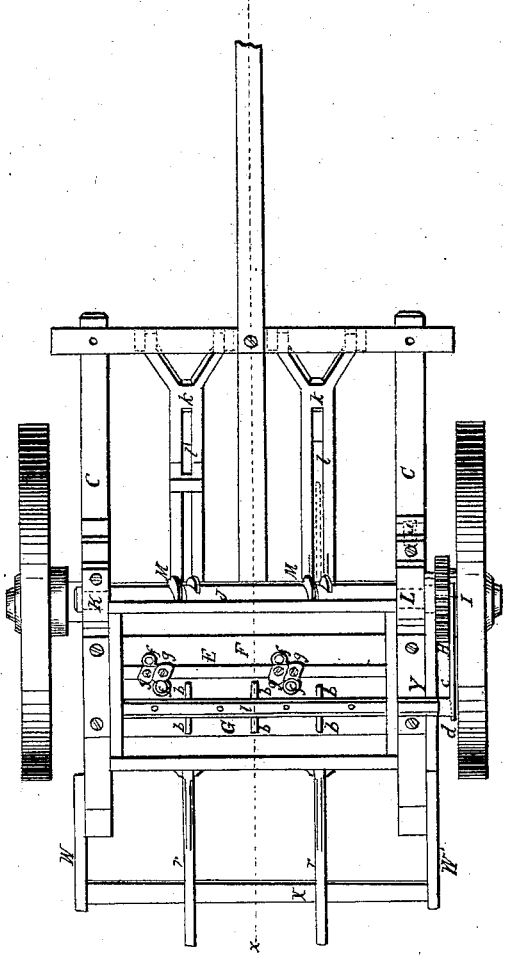

UNITED STATES PATENT OFFICE.

WM. CRESSLER, OF SHIPPENSBURG, PENNSYLVANIA.

IMPROVEMENT IN SEED-PLANTERS.

Specification forming part of Letters Patent No. 9,740, dated May 17, 1853.

*To all whom it may concern:*

Be it known that I, WILLIAM CRESSLER, of Shippensburg, in the county of Cumberland and State of Pennsylvania, have invented a new and useful Improvement in Seed-Planters; and I do hereby declare the following to be a full, clear, and exact description of the same, reference being had to the accompanying drawings, making a part thereof, in which—

Figure 1 represents a side view of my seed-planter; Fig. 2, a vertical longitudinal section through the red line $x\ x$ of Fig. 3; Fig. 3, a top view; Fig. 4, an enlarged section through one of the seeding-wheels, taken at the red line $y\ y$ of Fig. 5, and Fig. 5 a top view of the same.

Similar letters in the several figures represent the same parts.

The nature of my invention consists in the manner of constructing the seeding-wheel with a circular flange for dividing the grain from the lime, guano, ashes, or other material which may be sown with it, and the partitions in said seeding-wheel for regulating the quantity and distributing the same regularly to the opening through which it passes out of the machine.

To enable others skilled in the art to make and use my invention, I will proceed to describe the same with reference to the drawings.

On an axle, A, supported upon a pair of wheels, B, I arrange the frame C, firmly attached thereto, and upon which frame is arranged the hopper D, of the usual form and construction, which has a partition, E, running through it longitudinally, making therein two apartments, into one of which, F, is placed the grain to be sown, and into the other, G, lime, guano, ashes, or any other material to be sown with the grain.

To the hub of one of the wheels B is attached a cogged wheel, H, which meshes into a spur-wheel, I, on the shaft J, which has its bearings in boxes K L, one of which, K, is firmly secured on the top of one of the longitudinal pieces of the frame C. The other, L, is hinged at one end to the opposite longitudinal piece of the frame, as seen by dotted lines at $a$, Fig. 1, so as to allow said box to rise and fall sufficiently far to throw the spur-wheel out of and into gear, the box being kept in place when said spur-wheel is in gear by means to be hereinafter described.

On the shaft J, at suitable distances, are arranged the sections of a thread of a screw, M, which work into and rotate the seeding-wheels N, (one of which is seen in Fig. 2, and which is also represented in Figs. 4 and 5 on an enlarged scale,) and which seeding-wheels are provided on their outer periphery with oblique cogs for that purpose.

The seeding-wheels are arranged on a piece of timber, O, which extends across the machine, underneath the hopper, and is firmly mortised into or otherwise secured to the longitudinal pieces of the frame, and the said seeding-wheels are secured to said timber O by means of bolts, which allow them to rotate when the machine is sowing.

Through the cross-piece O is an opening, P, underneath each seeding-wheel of suitable size and shape to allow the grain and other material sown with it to escape into the tubes Q, from which may extend an elastic seeding-tube, which terminates in the shoe R.

The seeding-wheel may be constructed of brass, iron, or any other metallic substance, upon which is cast a ring or flange, S, for dividing the grain from the other material sown with it, and allowing a much greater proportion of lime, &c., to be sown than of the grain; and from the hub T of said seeding-wheel to said flange extend oblique spokes U, which form chambers for receiving the lime or other material and carry it around to the opening P in the cross-piece under said seeding-wheels, and allow it to escape into the tube Q, from which it is conveyed through the shoe into the ground.

The space between the flange and the periphery of the seeding-wheel is divided into smaller apartments or spaces for the grain by means of the curved partitions V, each apartment receiving a certain quantity and moving it around to the opening P, before described, from whence it is conveyed by the tubes into the ground.

To the rear of the longitudinal pieces of the frame are arranged the arms W W', being secured to the frame by bolts, upon which they may freely swing, and into the outer ends of these arms is framed the bar X, extending from one arm to the other. One of said arms, W', has a projection extending beyond the bolt, which secures it to the frame, and which projection is rounded off and fits into a similarly-constructed and rounded slot in one end of the vibrating lever Y, also secured to the frame, and forms with said vibrating lever a toggle-joint, the other end of said vibrating lever Y being forked so as to span the shaft J, so that when the bar X is raised or lowered it also raises or lowers the shaft J, upon which the spur-wheel I is affixed, and throws it out of or into gear, as may be desired.

Through the center, longitudinally of the lime-hopper G, passes a shaft, Z, having its bearings in the ends of said hopper, through which shaft are placed pins or arms $b$ for loosening up the lime or other material to be sown with the grain and prevent it from being clogged in the hopper, said shaft Z receiving a rocking motion by means of a connecting-rod, $c$, one end of which is secured to a crank, $d$, on the end of the shaft Z, which projects through the end of the hopper for that purpose, and the other end connected to a wrist-pin, $e$, on the spur-wheel I.

Through the bottoms of each of the apartments in the hopper are arranged the tubes $f$ for receiving and conveying the grain and other material to be sown into the apartments of the seeding-wheels, said tubes passing down into said seeding-wheels on each side of the flange S thereof, and by means of set-screws $g$ in the top of the shanks $h$ of said tubes, which shanks extend to the top of the partition E in the hopper. The said tubes are adjustable for the purpose of passing more or less grain or other material into the seeding-wheels as they are raised or lowered by means of said set-screws.

Projecting from the under side of the front cross-bar of the frame C are pieces $i$, to which are secured by bolts, so that they may swing thereon, the forked or diverging ends of the bar $k$, and to the other end of which bars are hinged the shoes R by means of a lug cast on said shoe at about its center. The bar $k$ is mortised out for the purpose of receiving a straight ratch, $l$, which is hinged in said mortise at one of its ends, the other end resting against the oblique end of said mortise to keep the ratch from falling below the bar. In rear of said ratch $l$ is secured the end of a spring, $m$, which spring is adjustable by means of the set-screw $n$ therein, the other end of said spring resting on the ratch to keep it in place.

To a lug in the top of the shoe R is hinged the brace $o$, which extends forward and has its end bent down, so as to fit against the vertical projection of the ratch $l$, so as to keep the shoe in proper position when no obstruction is offered to it, and when the point of the shoe strikes against a stone or other unyielding substance it forces the brace $o$ against the projection in the ratch and raises up its rear end, upon which is a projection which comes against the under side of said bar and raises it out of the ratch, which allows the bar to run forward and the shoe to fall back and pass over said obstruction.

Another method of arranging the tripping of the shoe, and which is more simple, though operating upon the same principle, is as follows: The ratch $l$ may extend backward through a slot in the bar $k$ sufficiently far to admit of a standard or adjustable fulcrum, $p$, through an open mortise in the end whereof may pass the brace $o$, and when any obstruction is offered to the point of the shoe the brace, pushing against the projection of the ratch, causes the ratch to rise and bring a projection upon it in contact with the under side of said brace and raises it out of the catch, when it runs forward and allows the shoe to fall back and slide over the obstruction, as before described.

The fulcrum $p$ is made adjustable by means of a tenon cut on its lower end, which slides in a groove cut in the upper part of the extended part of the ratch, and by sliding said fulcrum back or forward in said groove and securing it by a pin at any desired point any desired amount of leverage may be put upon the brace, so as to make it trip with a greater or less force of obstruction, as may be desirable.

On the rear of one of the cross-pieces, $q$, of the frame are attached staple-shaped pieces, into which the jaws of the lever $r$ catch, and to a projecting arm on the under side of said levers are attached the ends of the stay-chains $s$, the other ends of said stay-chains being fastened to a lug in the rear of the shoe, at its top. The ends of the levers $r$ rest upon the cross-bar X, and by their weight tend to keep the spur-wheel in gear by means of the arm W′ and vibrating lever Y, before described. When the bar X is raised up, as shown in Fig. 2, it raises up the levers $r$ and draws up, by means of the chains $s$, the shoes R clear of the ground and throws the spur-wheel out of gear by the same operation. When either of the shoes is tripped and is thrown back by any opposing obstacle the lever to which it is attached is raised by the operator, which brings the brace $o$ into place, when the lever is allowed to fall back again onto the bar X, thus allowing the shoe to be replaced in proper position without stopping the machine or breaking or repairing any of the parts of the apparatus.

Having thus fully described my invention, what I claim therein as new, and desire to secure by Letters Patent, is—

In combination with the adjustable tubes $f$, the seeding-wheel N, with its flange and partition for adjusting, receiving, and carrying the grain and other material to be sown with it around to the opening, whence it is conveyed to the ground, as herein fully described and represented.

WM. CRESSLER.

Witnesses:
T. C. DONN,
A. B. STOUGHTON.